United States Patent [19]
Cooper et al.

[11] Patent Number: 5,504,427
[45] Date of Patent: *Apr. 2, 1996

[54] ROTATIONAL POSITION SENSOR HAVING VARIABLE COUPLING TRANSFORMER

[75] Inventors: Stephen R. W. Cooper, Tustin, Mich.; Mark R. Wheeler, Columbus, Ind.

[73] Assignee: Nartron Corporation, Reed City, Mich.

[ * ] Notice: The term of this patent shall not extend beyond the expiration date of Pat. No. 5,357,256.

[21] Appl. No.: 342,573

[22] Filed: Nov. 21, 1994

Related U.S. Application Data

[63] Continuation-in-part of Ser. No. 974,453, Nov. 12, 1992, Pat. No. 5,367,526.
[51] Int. Cl.⁶ .............................. G01B 7/14; H01F 21/02
[52] U.S. Cl. ............................ 324/207.17; 324/207.13; 324/207.22; 324/207.25; 336/20
[58] Field of Search ................... 324/207.11, 207.13, 324/207.15, 207.17, 207.22, 207.25; 336/20

[56] References Cited

U.S. PATENT DOCUMENTS 4,631,478 12/1986 Knetsch et al. .
5,367,256 11/1994 Cooper et al. ............... 324/207.17

Primary Examiner—Walter E. Snow
Attorney, Agent, or Firm—Watts, Hoffmann, Fisher & Heinke Co.

[57] ABSTRACT

Several embodiments of a rotational position sensor having a variable coupling transformer are disclosed. Each sensor employs at least one magnetically permeable transformer core and a primary and secondary coil. The primary coil in coupled to a time varying electrical signal and is mechanically coupled through a transmission to a rotatable shaft whose position is to be measured. As the shaft is rotationally displaced, the primary coil changes orientation thereby changing an output signal induced in the secondary. A detector is coupled to the secondary coil to monitor the output signal and correlate the signal to the shaft's rotational displacement.

24 Claims, 7 Drawing Sheets

ROTATIONAL POSITION SENSOR HAVING VARIABLE COUPLING TRANSFORMER

CROSS-REFERENCE TO RELATED APPLICATION

The present application is a continuation in part of U.S. patent application Ser. No. 07/974,453 to Cooper et al. entitled MULTI-TURN POSITION SENSOR HAVING VARIABLE COUPLING TRANSFORMER which was filed on Nov. 12, 1992, now U.S. Pat. No. 5,367,526.

TECHNICAL FIELD

This invention relates to an orientation sensor and, more particularly, to a rotational sensing apparatus using a transformer for sensing the rotational position of a shaft.

BACKGROUND OF INVENTION

Sensors for sensing the rotational position of axles, shafts, or columns such as steering columns are known in the prior art. Rotation position means the orientation of the shaft plus the number of turns the shaft has rotated from a beginning or reference position. Such sensors generally operate in one of three ways. One manner of operation is to combine an orientation sensor with a mechanical or electrical counter to keep track of the specific turn that the sensor is sensing among a multiplicity of turns. The orientation sensor then provides the relative position within any given turn. The advantage of this type of sensor is that a great multiplicity (within the counter's range) can be accommodated. However, a disadvantage arises from the cost and reliability of the "counter" and signal discontinuities at the turn boundaries where the counter must increment the signal output and the orientation sensor must simultaneously return to its zero degree output. Mechanical counters are subject to wear and exhibit "dither" and/or "backlash" error at the increment point. Electronic counters lose their count upon loss of power unless expensive, non-volatile memory is incorporated in their design.

A second type of sensor is a "single-turn" orientation sensor combined with a reduction gear system to translate multiple turns into a single turn. The gear linkages introduce cumulative, mechanical hysteresis and dither, and are also susceptible to wear. High and costly precision in the mechanical linkages is required to minimize error. This precision, in turn, must be maintained in the moving parts (gears) that are most susceptible to wear. If high accuracy and/or high reliability is required, this type of sensor is not practical.

The third type of sensor is a "linear displacement" sensor which is combined with a mechanical conversion linkage such as a "worm drive" to translate multiple turns into a linear displacement. As with the reduction gear system of the second sensor type, the mechanical linkages introduce cumulative hysteresis and dither, as well as adding susceptibility to wear. High and costly precision is also required in these linkages to minimize error. This precision also must be maintained in the moving parts (gears) that are most susceptible to wear. High accuracy and/or high reliability requirements make this type of sensor impractical as well.

The single-turn or displacement sensors of these three sensor types can be either analog or encoder devices, but in all three types multiple turns are not sensed directly.

In certain applications it is desirable to measure small angular displacements of a shaft with a high degree of resolution. For instance, in a torsion bar that is used to measure torque. A rotational load is applied at one end of the torsion bar and the other end is fixed to a reference. The resulting twisting of the bar due to the rotational load results in a rotational displacement between the two ends. In most practical implementations, the maximum degree of rotation is a few degrees. A one percent of full scale of accuracy would then require a resolution on the order of three minutes rotation.

Present methods of measuring such small angles include rotary potentiometers, planar resolvers (a type of variable transformer) and Hall Effect devices among others. All of these methods have limitations in terms of cost, accuracy and/or reliability.

DISCLOSURE OF THE INVENTION

This invention provides a position sensor for sensing the rotational position of an axle such as a steering wheel column. The sensor measures absolute rotation about a fixed axis over multiple turns and can be configured for analog or digital output. Output of the sensor is inherently stable against temperature variation and exhibits no loss of calibration after a loss of power. The sensor can directly sense rotational position from a reference position through multiple turns.

Sensing apparatus constructed in accordance with one embodiment of the invention senses a rotational position of a shaft. A sensor coil monitors shaft position based upon a signal induced in the sensor coil. A transmission is coupled to the shaft for rotation with the shaft and is attached to a spiral conductor so that a configuration of the spiral conductor changes as the shaft orientation changes. An alternating current signal is applied to the spiral conductor and an output signal from the sensor coil related to orientation of the shaft is monitored.

Another embodiment of a sensing apparatus constructed in accordance with the present invention is particularly useful for measuring small angular displacements of a shaft. The sensing apparatus includes a shaft rotatable about an axis, first and second magnetically permeable transformer cores, a mechanical pickup coupled to the shaft through a transmission means and a detector means for detecting an induced signal in a sensor coil. A primary coil and a secondary coil are wound about the first transformer core in a spaced apart relationship. A time varying voltage signal is electrically coupled to the primary coil and through magnetic coupling induces a signal in the secondary coil.

A single loop flexible primary coil overlies a segment of the second transformer core while the sensor coil is wrapped about the second core in a spaced apart relationship with respect to the single loop flexible primary coil. The single loop primary coil is affixed to the second core at one position and is electrically coupled to a first end of the first transformer core secondary coil at that same position. At a second position, the single loop primary coil is affixed to the mechanical pickup and is electrically coupled to a second end of the secondary coil. The electrical coupling of the secondary coil and the single loop primary coil energizes the single loop primary coil and thereby magnetically induces a signal in the sensor coil. Affixing the single loop primary coil to the second transformer core and the mechanical pickup essentially divides the single loop primary coil into two legs, each leg wrapped ½ turn in an opposite sense about the second transformer core. The mechanical pickup is coupled to the transmission means such that as the shaft is rotatably displaced, the mechanical pickup moves with respect to the second core, increasing a portion of the second core wrapped by one leg of the single loop primary coil (that is, making the portion wrapped more than ½ turn) and correspondingly decreasing a portion of the second core wrapped by the other leg of the coil (that is, making the portion of the second core wrapped less than ½ turn). The signal in the sensor coil varies as a result of the change of the portions of the core wrapped by the respective legs. The detector means monitors the induced signal in the sensor coil and correlates the induced signal with the rotational position of the shaft.

In yet another embodiment of a sensing apparatus of the present invention, the necessity of a constant current drive (as provided by a current limiting resistor coupled in series with the primary winding) is eliminated. This embodiment includes a shaft that rotates about an axis, a magnetically permeable core and a detector means which senses the induced signal in a sensor coil. A transmission means is coupled to and rotates with the shaft and overlies a segment of the core. One end of a "clock spring" or spiral coil is affixed to the transmission means and is electrically coupled to a time varying voltage signal. Two spaced apart coils, wound in opposite turn senses on other spaced apart segments of the core, are electrically coupled in parallel to an opposite end of the spiral coil. The energized spiral coil and two spaced apart coils induce a signal in the sensor coil. As the shaft is rotatably displaced, the effective number of turns of the spiral conductor about the core changes. This causes the induced signal in the sensor coil to vary. The detector means detects the induced signal in the sensor coil and the signal is correlated with the rotational position of the shaft.

These and other objects, advantages and features of the invention will become better understood from a detailed description of a preferred embodiment of the invention which is described in conjunction with the accompanying drawings.

BEST MODE FOR PRACTICING THE INVENTION

Figure 1:
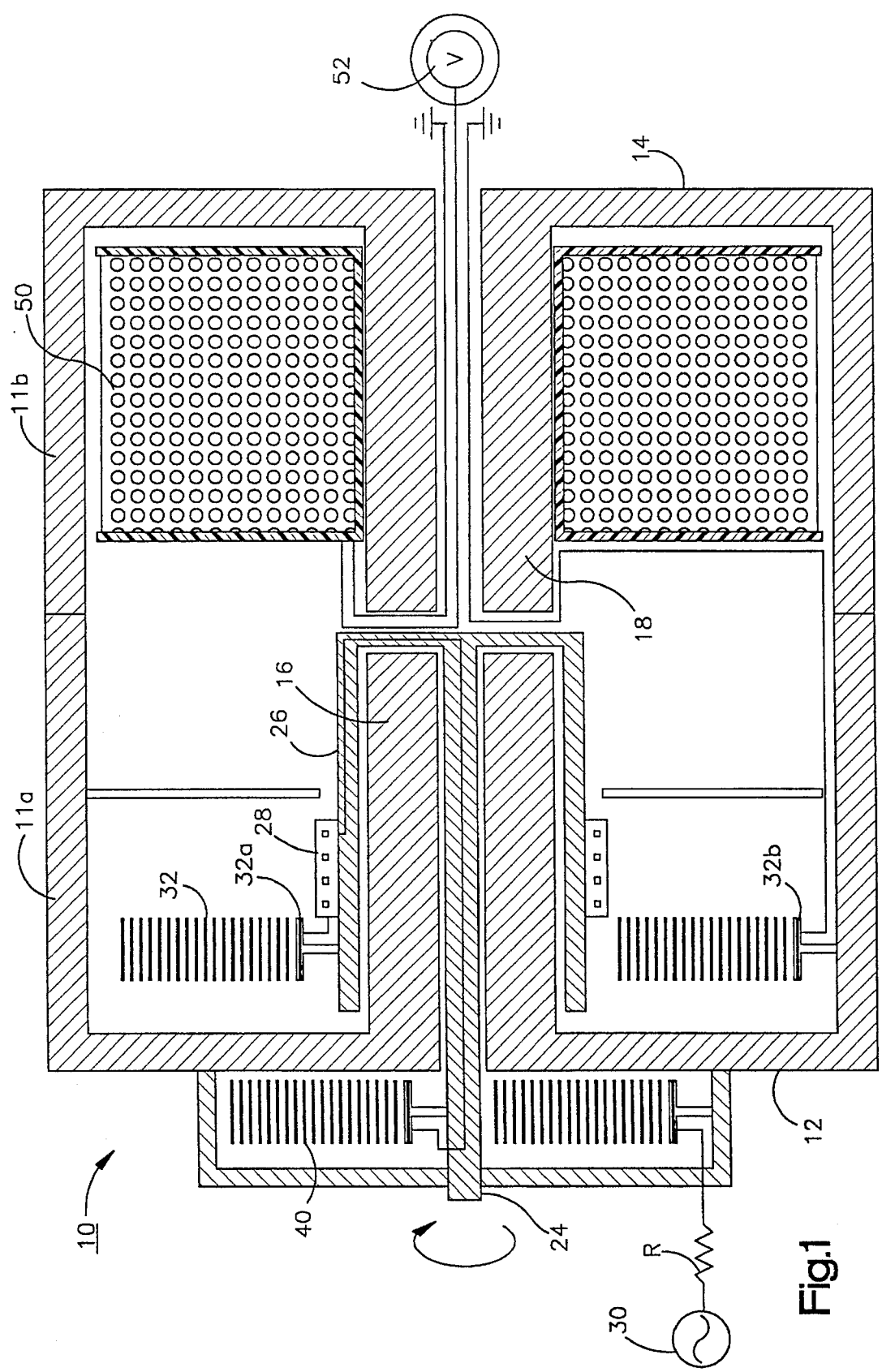
FIG. 1 is a section view of a rotational position sensor apparatus.

In a preferred embodiment of the invention, a rotational sensor 10 comprises a generally cylindrical housing that includes first and second ferrite housing segments 11a, 11b. Extending axially inward from opposite ends 12, 14 of the housing portions 11a, 11b are two annular transformer cores 16, 18. A left most core 16 surrounds an axle 24. A transmission 26 is coupled to the axle 24 for rotation with the axle and is located around a portion of the core 16. A primary coil 28 is attached to the transmission structure and is connected to a signal source 30.

The sensor further comprises a variable primary coil 32 in the form of a flexible conductor that is wound in a sense opposite the primary coil 28. An inner end 32a of the flexible conductor is connected to the transmission 26 and an outer end 32b is connected to the housing segment 11a and is grounded. A current limiting resistor R acts as an input terminal to coil 40.

A strain relief coil 40 is electrically connected to the primary coil and has an inner end that is connected to the axle 24 and an outer end that is connected to the housing and is electrically connected to the current limiting resistor R.

A secondary coil 50 is wound about the core 18 and monitors a magnetic field induced by the flexible conductor 32. The secondary coil 50 produces an output signal in response to the magnetic field. The output signal is monitored in order to determine the rotational position of the axle.

The sensor is configured as a gaped transformer with a fixed secondary coil 50 and a variable turn primary coil 32 for inducing a signal in the secondary coil, as well as, the variable turn strain relief coil. The secondary and primary coils are situated within the magnetic circuit of the housing portions 11a, 11b.

The variable turn and strain relief coil are preferably made of a flexible and electrically conductive material assembled in "clock spring" or spiral configurations. Rotation is sensed by providing a time-varying electrical excitation to the variable coil 32 while "winding" or "unwinding" it and thereby changing its effective number of turns. As the number of turns of the variable transformer coil 32 varies, the transformer coupling between the primary and secondary coils, along with the electromagnetic field induced in the secondary coil, is altered. The electromagnetic field in the secondary coil is readily measured by a high-input impedance voltage sensor 52 connected to the secondary coil's leads. By placing the strain relief coil 40 in an electrical series connection, the use of a "flying lead" or wiping contact with the winding end of the variable transformer is eliminated.

A time-varying signal ($V_{PRIM}$) which nominally is 3 $V_{PP}$ and 12.8 KHz is input to the current limiting resistor R from the source 30 with return on the lead of the outer end of the variable transformer. The current limiting resistor R is selected to have greater than 100 times the impedance of the variable transformer in the unwound position. This results in an approximately constant drive for the sensor. An induced emf ($V_{SEC}$) can then be observed at the secondary coil where:

$$|V_{SEC}|(\text{Peak to Peak}) = \frac{wI_P \cdot N_P \cdot N_S}{R}$$

with w=angular velocity in radians=$2\pi$ "primary frequency," * $I_p$="primary peak to peak current," $N_P$="total primary turns," $N_S$="total secondary turns," R is the "magnetic reluctance" of the magnetic circuit of the sensor. Ideally, the transformer gap is sufficiently large to contain greater than 99% of the reluctance R of the device and thereby minimize variation in R over temperature. The mechanical stability of the magnetic portions of the device (nothing magnetic moves) results in R being effectively constant during normal operation of the device. Additionally, construction of the housing by using ferrite or a similar material for desired magnetic components, results in core losses being negligible during operation of the sensor. The input impedance of the primary is dominated by the current limiting resistor so that current in the primary is approximately the voltage of the source divided by the resistance of the current limiting resistor R.

As the axle 24 turns, it either winds or unwinds the flexible conductor 32 and the strain relief coil 40. Because the strain relief coil lies outside the magnetic circuit formed by the housing portions 11a, 11b and the transformer core, it can be expected to have negligible effect on $V_{SEC}$ as it winds or unwinds. However, the flexible conductor, by being situated about the core, is in the magnetic circuit of the device. As the flexible conductor 32 winds and unwinds, the effective number of primary turns ($N_P$) will increase or decrease resulting in a radiometric change between $V_{SECPP}$ and the rotation of the axle. Note the $N_P$ is continuously varying as the axle turns and is not restricted to integer values. The peak to peak amplitude of $V_{SEC}$ ($V_{SECPP}$) is then directly proportional to the total number of primary turns ($N_P$). $V_{SECPP}$ is extracted from $V_{SEC}$ by amplitude demodulation. Demodulation can be achieved by full-wave rectification of $V_{SEC}$ followed by low-pass filtering among other methods available to those skilled in the art of electronics.

Figure 2:
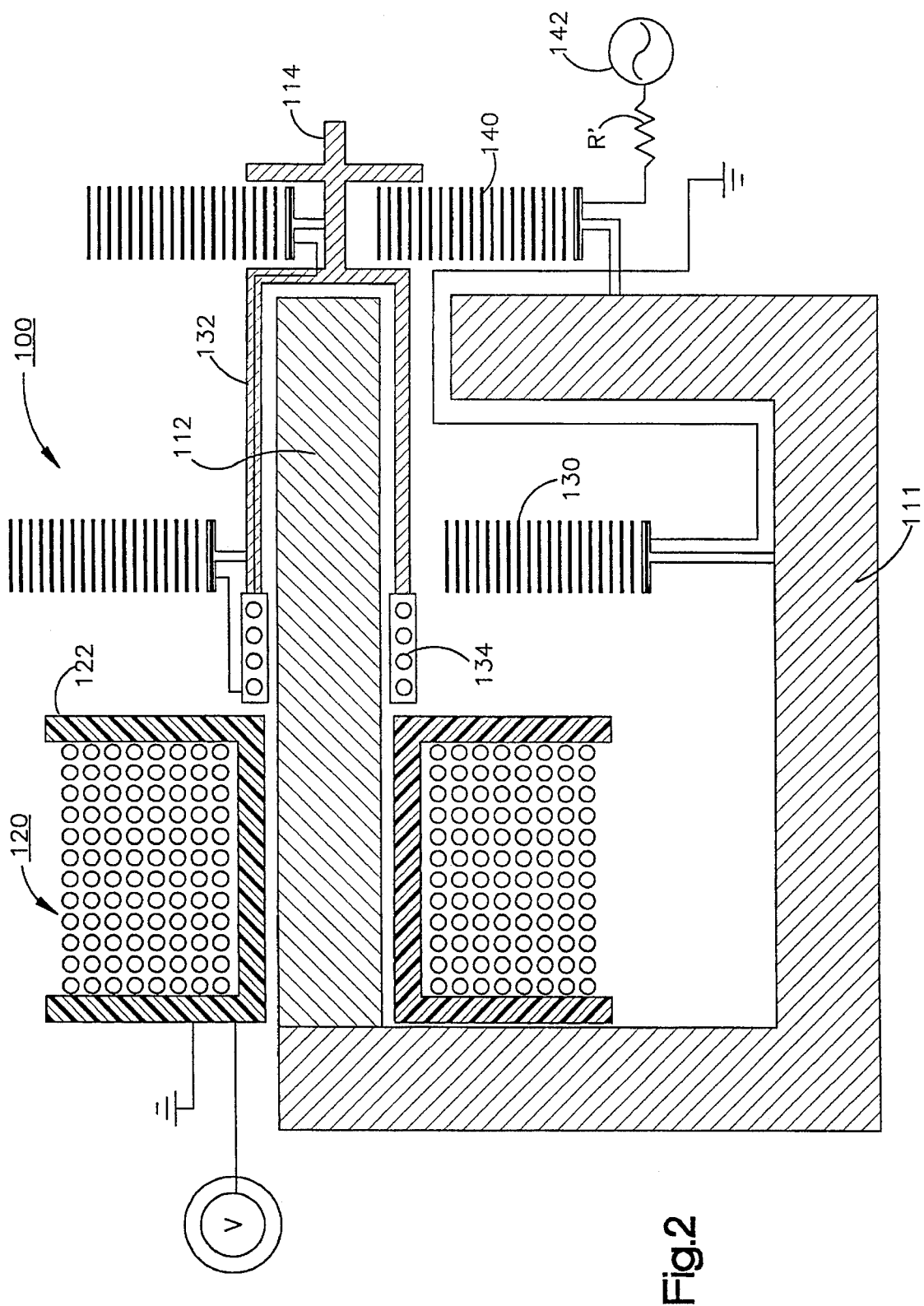
FIG. 2 is a section view of a second embodiment of a rotational position sensor apparatus.

An alternative embodiment of the sensor 110 is depicted in FIG. 2 and comprises a square frame 111 having a cylindrical support 112 co-axial with a shaft 114. The transformer core and the magnetic circuit of the transformer of the preferred embodiment remain substantially unchanged during normal operation of the sensor embodying the alternate embodiment. A secondary coil 120 containing a large number of turns is wound on a bobbin 122. The bobbin 122 is fixed to and situated about the cylindrical support of the square frame and remains stationary. The secondary coil has leads that are brought out of the bobbin and act as terminals where an output signal is monitored. A flexible conductor 130 is arranged in a "clock spring" or spiral configuration and is situated about the cylindrical support of the square frame. The flexible conductor has an inner end that is mechanically tied to a transmission 132 that rotates about the cylindrical support 112 and an outer end that is mechanically tied to the square frame 111.

The alternate embodiment further comprises a fixed primary coil that is mechanically connected to and rotates with the transmission 132. The fixed primary coil 134 is electrically connected in series to the flexible conductor 130. The fixed primary coil 134 is also connected to a strain relief coil 140 in series.

The strain relief coil is situated about the axle and is configured in a "clock spring" or spiral arrangement. The inner end of the strain relief coil is mechanically connected to and rotates with the axle while the outer end is connected to the square frame. The strain relief coil is electrically grounded. A current limiting resistor R' is electrically connected in series with the strain relief coil 140 and serves as the input terminal for a time-varying drive signal from a signal source 142.

In the alternative embodiment, the time-varying signal ($V_{PRIM}$), which nominally is 3 $V_{PP}$ and 12.8 KHz is input to the current limiting resistor R' with return on the grounding connection. The current limiting resistor R' is selected to have greater than 100 times the impedance of the flexible conductor 130 in its "unwound" position. This results in an approximately constant current drive for the device. An electromagnetic field ($V_{SEC}$) is induced in the secondary coil 120. Ideally, the transformer gap is sufficiently large to contain greater than 99% of the reluctance of the sensor and thereby minimize variation in reluctance with temperature. The mechanical stability of the magnetic portions of the device (nothing magnetic moves) results in the reluctance being effectively constant during normal operation of the device. Additionally, the use of material such as ferrite or similar material for its magnetic components results in core losses being negligible during operation of the sensor. The input impedance of the primary coil is dominated by the current limiting resistor.

As the axle 114 turns, it either winds or unwinds the flexible conductor 130 and the strain relief coil 140. Because the strain relief coil 140 lies outside the magnetic circuit formed by the square frame, it can be expected to have negligible effect on $V_{SEC}$ as it winds or unwinds. However, the flexible conductor 130, by being situated about a cylindrical extension of the square frame, is in the magnetic circuit of the device. As the flexible conductor winds and unwinds, the effective number of primary turns ($N_P$) will either increase or decrease resulting in a radiometric change between $V_{SECPP}$ and the rotation of the axle. The peak to peak amplitude of $V_{SEC}$ ($V_{SECPP}$) is then directly proportionally to the total number of primary turns ($N_P$). Note, $N_P$ is continuously varying as the axle turns and is not restricted to integers values. $V_{SECPP}$ is extracted from $V_{SEC}$ by amplitude demodulation. Demodulation can be achieved by full-wave rectification of $V_{SEC}$ followed by low-pass filtering among other methods available to those skilled in the art of electronics.

In its broader aspects then, the invention provides a sensing apparatus for sensing an orientation of an axle. The sensing apparatus comprises sensing structure including a sensor coil for monitoring axle orientation based upon a signal induced in the sensor coil. The sensing apparatus further comprises the transmission structure coupled to the axle for rotation with the axle. A spiral (clock spring) conductor is included having an inner end attached to the transmission structure to cause a configuration of the spiral conductor to change as the axle orientation changes. Connectors are included for fixing an outer end of the spiral conductor. Electrical conductors are connected to the outer end for maintaining the outer end of the spiral conductor at a fixed electric potential. A power supply for applying an alternating current signal to the spiral conductor energizes the sensor and an output monitor is connected to the sensor coil for monitoring signals induced in the sensor coil and correlating the induced signal with the orientation of the axle.

Figure 3:
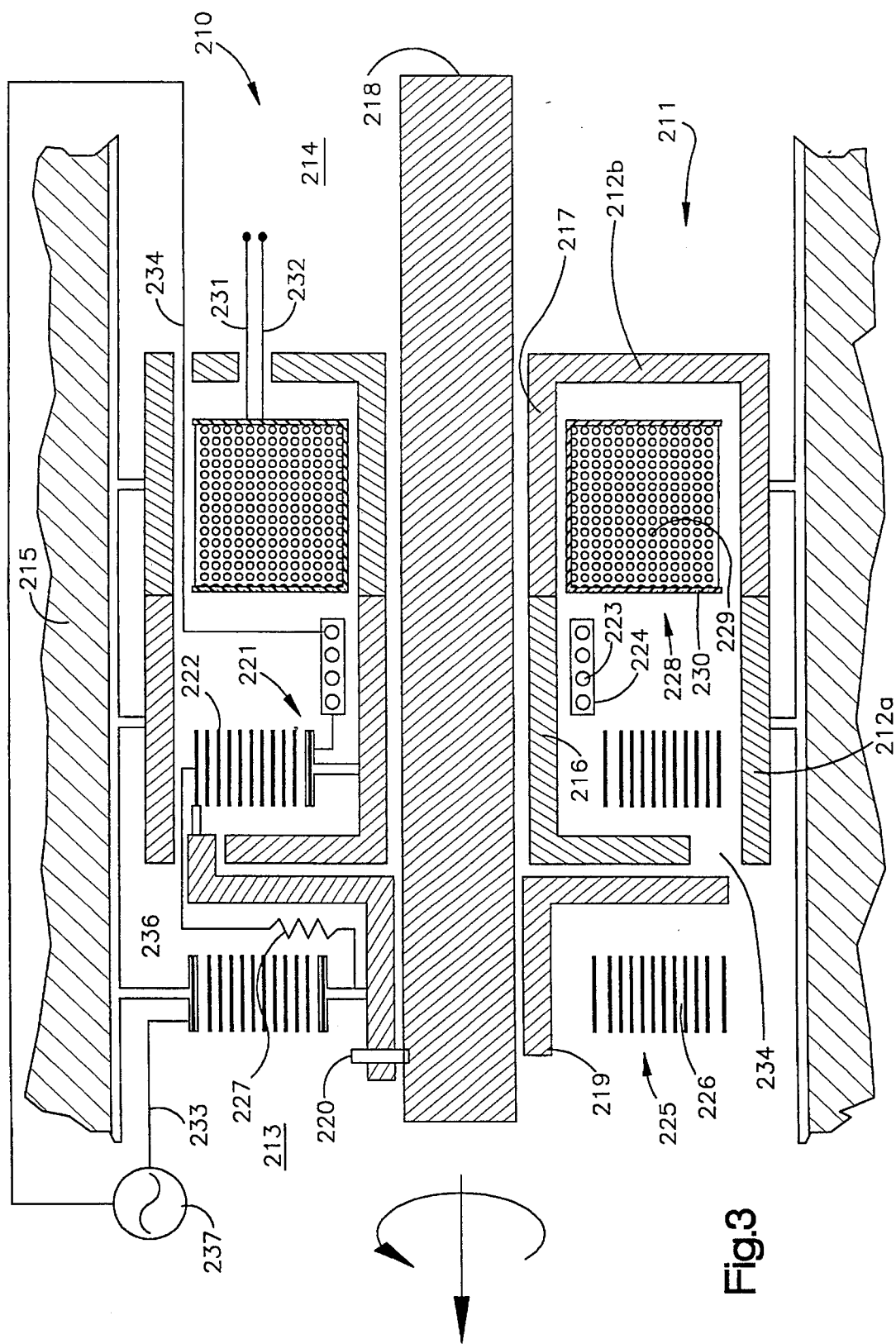
FIG. 3 is a section view of a third embodiment of a rotational position sensor apparatus.

Referring to FIG. 3, a third embodiment of the sensor 210 comprises a generally cylindrical first housing 211 that is non-rotating and includes 1st and 2nd transformer housing segments 212a, 212b which are mounted to a non-rotating member 215. Extending axially inward from opposite ends 213, 214 of the housing portions 212a, 212b are two annular transformer cores 216, 217 that surround but do not contact an axle 218. The transformer cores ideally are composed of ferrite but could also be constructed of other suitable transformer material. A second rotating housing 219 is situated colinearly and coaxially with respect to the first housing 211. The second housing 219 surrounds and rotates with the axle 218. Housing 219 is fixed to axle 218 by pin 220.

The sensor further comprises a two-part primary coil 221 in the form of a first loosely wound flexible conductor 222 and a fixed, tightly wound conductor 223 on bobbin 224. Conductors 222, 223 are wound with approximately the same number of turns in the opposite sense of each other. They are then placed over transformer core 216 as shown and are electrically connected in series. A strain relief coil 225 comprised of a loosely wound flexible conductor 226 is situated on the rotating housing part 219. The strain relief coil conductor 226 and the primary coil conductor 222 are electrically connected in series through a resistor 227. A secondary coil 228 comprised of a tightly wound conductor 229 on bobbin 230 is situated about core 217. The two leads 231, 232 of conductor 229 are brought out of the transformer core 217 and housing part 212b. A lead 233 of flexible conductor 226 extends from the non-rotating end of 226 which is fixed to the external non-rotating member. An additional lead 234 extends from conductor 223 and is brought out of the transformer core 217 and housing part 212b as shown.

The sensor 210 is configured as a gaped voltage transformer with a fixed secondary 228 and a variable primary 221 for inducing a signal in the secondary. The coils 221 and 228 are situated in and are magnetically linked by the transformer cores 216, 217. The strain relief coil 225 is situated without the transformer cores 216, 217 and substantially has no direct transformer coupling to the secondary coil 228. Axle rotation is sensed through the "winding" or "unwinding" of the loosely wound, flexible primary conductor 222 via linkage 236 in conjunction with a time-varying electrical excitation 237 applied to coil 221. The "winding" or "unwinding" action changes the number of turns about the transformer core of conductor 222 which, in turn, changes the relative balance of turns between the coils formed by conductors 222, 223. This results in a net change in the number of turns in primary coil 221 and directly alters the signal induced in the secondary coil 228. In this third embodiment, the time-varying excitation 237 is nominally a 3 $V_{PP}$ and 12.8 KHz a.c. signal applied across leads 233, 234. The resistance R'" of the current limiting resistor 227 is selected to have greater than 100 times the impedance of the primary coil 221 in the nominal "unwound" axle position. This results in an approximately constant current drive for the device. When the primary conductors 222, 223 are unbalanced so that there are more turns on one conductor than on the other, an EMF ($V_{SEC}$) is induced in the secondary coil 228. Ideally the transformer gap 235 is sufficiently large to contain greater than 99% of the reluctance of the sensor and thereby minimize variation in reluctance with temperature. The mechanical stability of the magnetic portions of the device (no magnetic part of the transformer moves) results in the reluctance being substantially constant during normal operation of the device. Additionally, the use of material such as ferrite for its magnetic components reduces core losses during operation of the sensor.

As the axle 217 turns, it either winds or unwinds flexible conductor 222 and the strain relief conductor 226. The winding and unwinding of conductor 226 has virtually no effect on the EMF induced in the secondary coil 228 as conductor 226 is situated outside the transformer cores 216, 217. However, as conductor 222 winds or unwinds, the net number of primary turns $N_P$ changes and results i a radiometric change in the EMF ($V_{SEC}$) induced on the secondary coil 228. The peak-to-peak amplitude of $V_{SEC}$ ($V_{SECPP}$) is then directly proportional to net number of primary turns $N_P$. Note, $N_P$ is continuously varying as the axle turns and is not restricted to integer values. Note also that the shape of the cores 216, 217 effectively shields the primary 221 and secondary 228 coils from effects associated with magnetic properties of the axle 218. Demodulation of $V_{SEC}$ to measure $V_{SECPP}$ is readily achieved by full-wave rectification followed by low pass filtering among other methods available to one skilled in the art of electronics.

Figure 4:
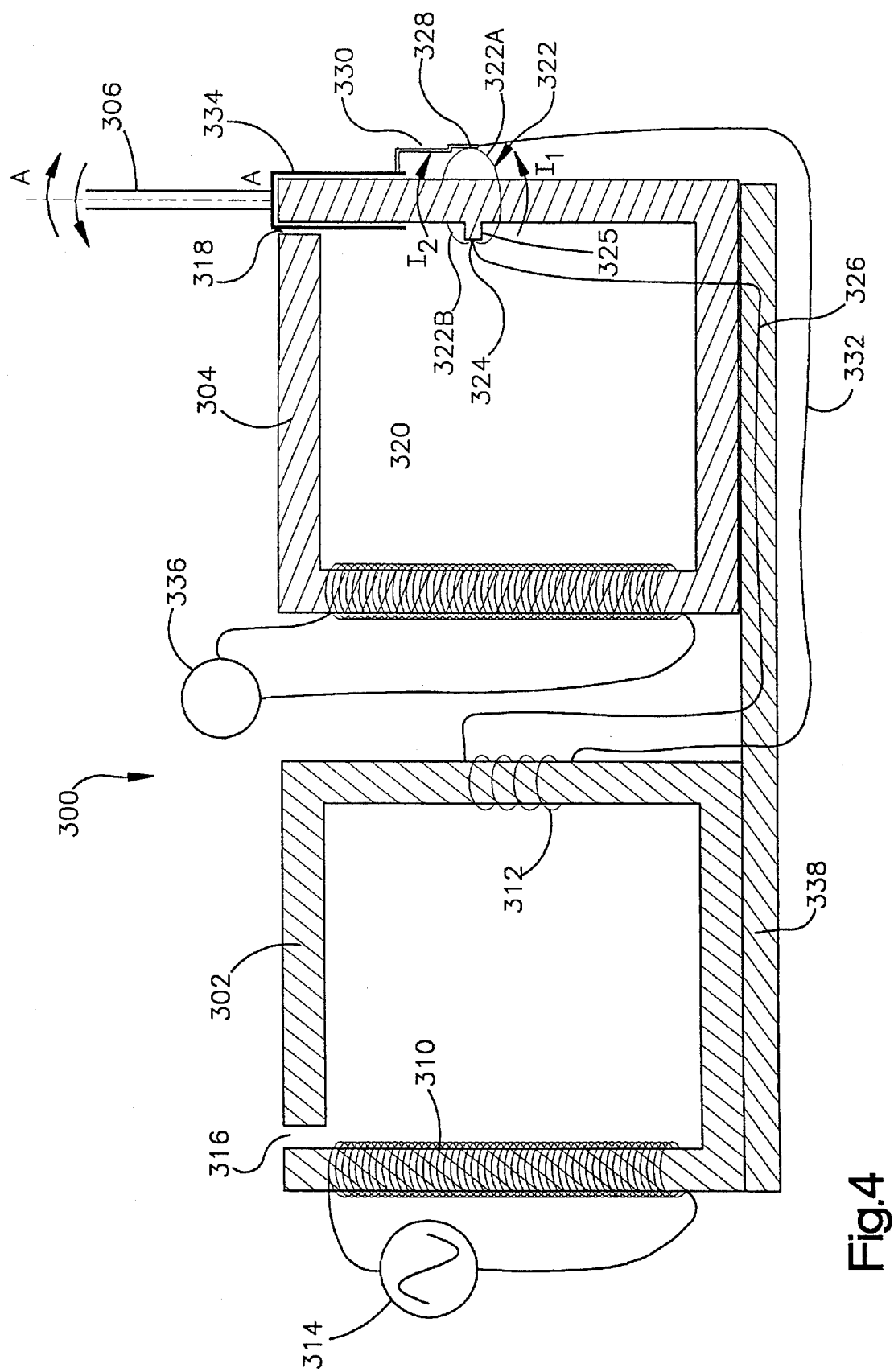
FIG. 4 is a schematic view of a fourth embodiment of a rotational position sensor apparatus advantageously employed to measure small angular displacement of a shaft.

An alternate embodiment of a rotational position sensor, which may be advantageously employed to sense and measure small angle displacements of a shaft, is shown in FIG. 4. The sensor apparatus 300 employs first and second transformer cores 302, 304 to measure the rotational displacement of a shaft 306 which rotates about an axis of rotation A—A. Preferably, the cores are square frames composed of a magnetically permeable material such as ferrite, laminated steel or another such low eddy current material. However, the cores 302, 304 could have other possible shapes such as cylindrical "pot cores." The first transformer core 302 is wound with a primary coil 310 and a spaced apart secondary coil 312, which together form a current transformer when a time varying (typically sinusoidal)voltage input 314 is applied to the primary coil 310. The secondary coil's wire and load are selected from heavy gauge or otherwise low impedance conductor materials. The number of turns "N" of the primary coil 310 exceeds the number of turns "M" of the secondary coil 312 thereby stepping down the voltage as M/N and correspondingly stepping up the current as $$\frac{M}{N} \cdot \frac{N^2}{M} = \frac{N}{M}$$

induced in the secondary coil in comparison to the voltage across and the current through the primary coil. The low impedance and load of the secondary coil 312 allow the greater current developed in the secondary coil. To minimize core reluctance variation with temperature changes, the first and second transformer cores 302, 304 include gaps 316, 318.

Wound around the second transformer core 304 is a sensor coil 320. A signal is magnetically induced in the sensor coil 320 by a single loop flexible primary coil 322, which is spaced apart from the sensor coil. At a first position 324 on the single loop primary coil 322, the single loop primary coil is affixed to a raised extension 325 of the second transformer coil 304. A conductive lead 326 extends from a first end of the first transformer core secondary coil 312 and is coupled to the single loop primary coil 322 at the first position 324. At a second position 328 on the single loop primary coil 322, the single loop primary coil is affixed to a mechanical pickup 330. A second conductive lead 332 extends from a second end of the first transformer core secondary coil 312 and is coupled to the single loop primary coil 322 at the second position 328. The single loop primary coil 332, being electrically coupled to the first transformer core secondary coil 312, is thereby energized. The mechanical pickup 330 is coupled to a capstan 334 overlying a segment of the second core. The capstan 334 is, in turn, affixed to an end of the shaft 306. Thus, as the shaft 306 is rotatably displaced, the capstan 334 moves in conjunction with the shaft and the mechanical pickup 330 is rotationally displaced with respect to the second core 304.

Preferably, the first and second positions 324, 328 of the single loop primary coil 322 are 180 degrees apart, thereby effectively dividing the primary coil into two equal length arcuate legs 322A, 322B overlying or wrapped about a portion of the second transformer core 304 in opposite turn senses. A diameter of the single loop primary coil 322 must be greater than an outer diameter of the portion of the second transformer core overlied by the single loop primary coil so that there is sufficient slack to permit the mechanical pickup 330 to rotate about the second core 304 to a limited extent without breaking one of the legs 322A, 322B. Of course, it is clear that the sensing apparatus 300 is limited by the slack present in the legs 322A, 322B to measuring relatively small angle displacements of the shaft 306. When the shaft 306 is in a neutral position, the mechanical pickup 330 is in an equilibrium position, as is shown in FIG. 4, and each leg 322A, 322B overlies an equal angular portion of the second core, namely 180 degrees or ½ turn.

Assuming that current flows from secondary coil 312 to the single loop primary coil 322 through conductive lead 326, the current splits at the first position 324 on the single loop primary coil 322 and passes through legs 322A, 322B in opposite senses around the second transformer core 304. Currents $I_1$, $I_2$ through the respective legs 322A, 322B are equal. Thus, when the mechanical pickup 330 is in the equilibrium position, the equal currents I1, I2 through oppositely wound legs 322A, 322B results in no net inducement of magnetic flux in the second core 304 and no induced EMF in the sensor coil 320 wrapped around the second transformer core 304. However, when the shaft 306 is rotationally displaced from its neutral position thereby causing the mechanical pickup 330 to move rotationally with respect to the second core, one leg of the single loop primary coil 322 will "wrap" further around second core 304 and the other leg will "unwrap" (limited of course by the total slack in the single loop primary coil).

For a two degree movement relative to second core 304, one leg of the flexible primary coil 322 will have 182 degrees of overlap or turn around the second core 304 and the other leg will have 178 degrees of overlap or turn. In such an orientation, the two opposite sense current paths through the legs 322A, 322B will no longer cancel. A magnetic flux proportional to the net 4 degrees of unbalanced overlap or turn will result in a variation in a signal in sensor coil 320 as compared with a signal generated in the secondary when the shaft is in the neutral position. The sensor coil 320 will typically have a large number (100s) of turns to maximize the induced EMF in the sensor coil. As a result, sensor coil 320 and single loop flexible primary coil 322 will function as a voltage amplifier. The induced EMF is then measured by a detector 336.

While the capstan 334 is on the second core 304 it should also be appreciated that the capstan may alternately be disposed on a rod 338 to which the first and second transform cores 302, 304 are secured.

Figure 5:
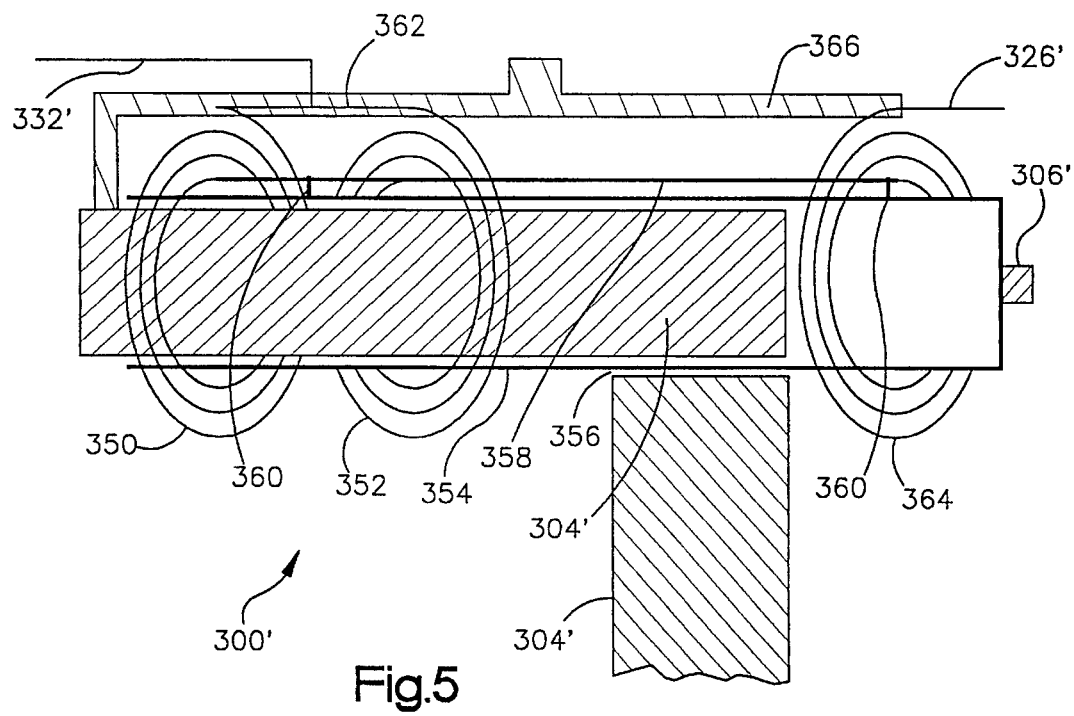
FIG. 5 is a schematic view of a portion of an alternate embodiment of another rotational position sensor apparatus advantageously employed to measure small angular displacement of a shaft.

A second embodiment of a small angle sensing apparatus 300' is shown in FIG. 5. Only a portion of a second transformer housing 304' is shown in FIG. 5, the remainder of the sensor apparatus 300' being identical to the sensor apparatus 300 illustrated in FIG. 4. In the embodiment in FIG. 5, the single loop flexible primary coil 322 shown in the FIG. 4 configuration is replaced by two oppositely wound "clock spring" or spiral coils 350, 352 which are connected in parallel and overlie spaced apart portions of a second transformer core 304'. One end of each of the spiral primary coils 350, 352 are coupled to a capstan 354 which extends through a gap in the second transformer core 304'. The capstan 354 is attached to an end of a shaft 306'.

An inner end of each spiral primary coil 350, 352 is coupled to the capstan via a conductor lead 358 and a pair of posts 360. The two primary coils 350 and 352 are wound with opposite turn senses and are connected in parallel electrically by the conductor lead 358 and another conductor lead 362 which couples an outer end of each spiral coil 350, 352. The spiral primary coils 350, 352 are magnetically linked by the second transformer core 304'.

A third "clock spring" or spiral coil 364 which serves as a strain relief coil is situated outside the second transformer core 304' and is also connected at an inner end to conductor lead 358 thereby placing the strain relief spiral coil 364 in electrical series with the parallel combination of spiral primary coils 350, 352. The outer ends of the spiral primary coils 350, 352 and the strain relief spiral coil 364 are attached at their respective outer ends to an assembly 366 which is mechanically fixed to the second transformer core 304'. The outer end of the strain relief spiral coil 364 is electrically connected to an end of the secondary coil (not shown) wound about the first transformer core (not shown) via a conductor lead 326'. Similarly, another conductor lead 332' electrically couples a second end of the first transformer core secondary coil (not shown) to the conductor lead 362. Recall that conductor lead 362 electrically connects the outer ends of spiral primary coils 350, 352. Voltage is induced in the first transformer core secondary coil (not shown) as explained with respect to the sensor apparatus embodiment shown in FIG. 4. This induced voltage is connected to the spiral coils 350, 352, 364 via the conductor leads 356', 358, 362, 332' thereby energizing the coils. As the shaft 306' is rotated, the capstan 358 also rotates causing one of the two spiral primary coils 350, 352 to increase the number of turns wound about the second transformer core 304' while the other of the spiral primary coils correspondingly decreases the number of turns wound about the second transformer core 304'. In the equilibrium position of the shaft 306', both coils 350 and 352 will have an equal number of turns resulting in no net flux induced in the second transformer core 304'. However, once the shaft 306' is rotationally displaced from the neutral position, the spiral primary coils 350, 352 will become unbalanced and a net flux will be induced in the second transformer core 304' and result in a signal being developed in a sensor coil (not shown) wound around the second transformer coil 304' and magnetically coupled to the spiral primary coils 350, 352. As a lower cost option, one of the two spiral primary coils 350, 352 can be eliminated. The remaining spiral primary coil will then wind or unwind as the shaft 306' is turned and thereby vary the induced flux in the secondary coil (not shown) wound about the second transformer core 304'.

Figure 6:
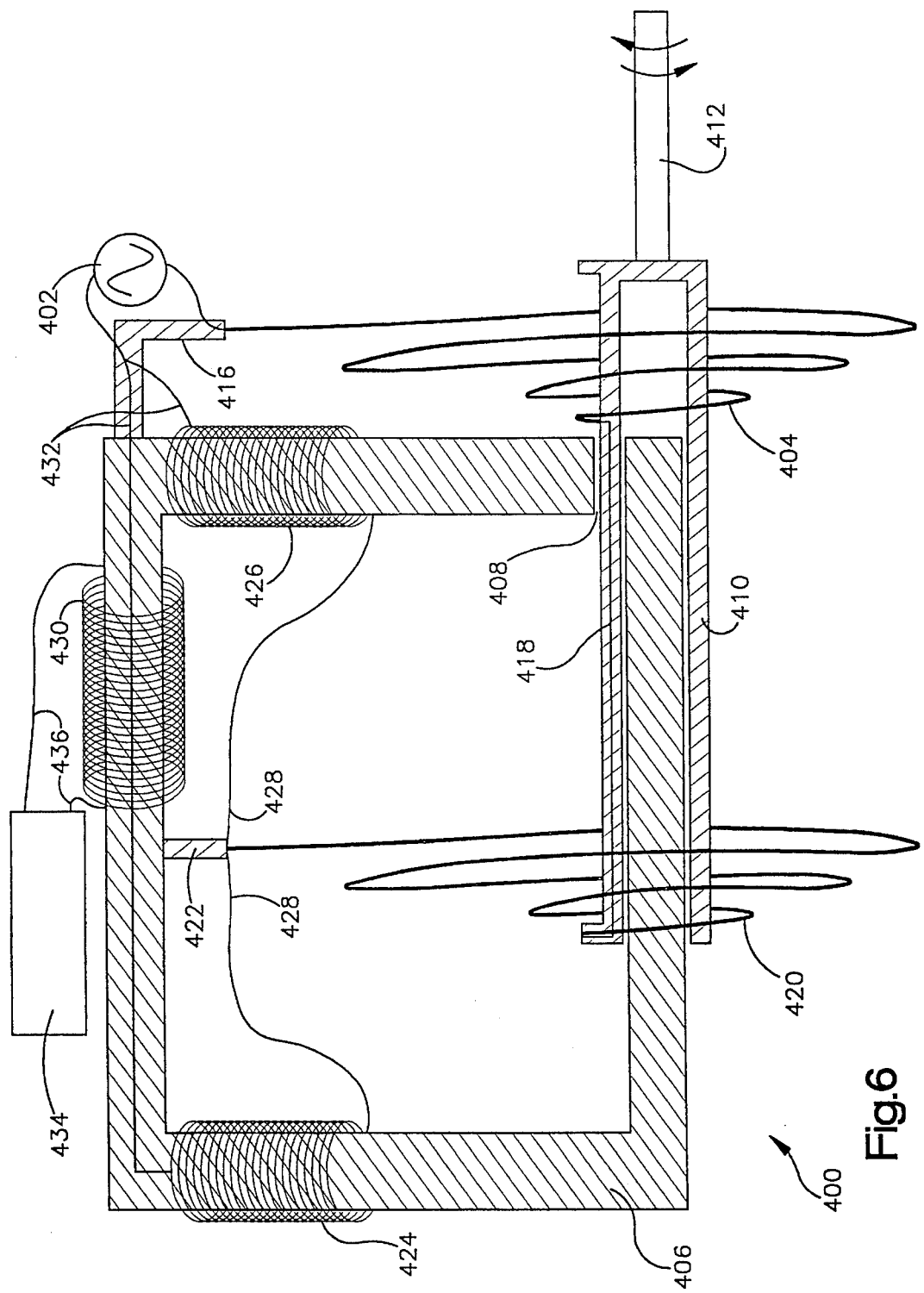
FIG. 6 is a schematic view of another embodiment of a rotational position sensor apparatus having a constant voltage drive.

Yet another embodiment is shown in FIG. 6. The advantage of this sensor apparatus embodiment is that a constant current drive is not required for operation of the sensor apparatus, shown generally at 400. Recall that in the first three sensor apparatus embodiments (FIGS. 1–3), a high impedance resistor was utilized to provide an essentially constant current drive to the primary coil. The sensor apparatus 400 constructed in accordance with FIG. 6 eliminates this necessity. Instead, a constant voltage drive is used.

A voltage input 402 applies a time varying voltage to an outer end of a strain relief "clock spring" or spiral coil 404 which lies outside a square transformer core 406. The transformer core 406 includes a gap 408. A capstan 410, attached to an end of a shaft 412, rotates with the shaft. A portion of the capstan extends through the gap 408 and overlies a section of the transformer core 406 adjacent the gap. An inner end of the strain relief spiral coil 404 is affixed to the capstan 410 while an outer end of the spiral coil is affixed to an extension member 416 coupled to the core 406. The inner end of the strain relief spiral coil 404 is, in turn, connected in electrical series via a conductor lead 418 to an inner end of a "clock spring" or spiral primary coil 420 which is attached at its inner end to the capstan 410 and attached at its outer end to another extension member 422 coupled to the transformer core 406. The spiral coil 420 is wrapped a multiple number of times around a portion of the transformer core 406. The outer end of the spiral coil 420 is connected in electrical series to a parallel combination of fixed coils 424, 426 via conductor leads 428.

The spiral primary coil 420 and the parallel combination of fixed coils 424, 426, which are wound about spaced apart portions of the core 406, constitute a set of primary coils which, when energized, induce a signal in a sensor coil 430. The fixed coils 424, 426 are wound with opposite turn senses on spaced apart portions of transformer core 406 and are connected to the return side of voltage input 402 via leads 432. The sensor coil 430 is also wound on core 406 and is connected to a high impedance detector 434 by leads 436. Due to their location on core 406, spiral primary coil 420, fixed primary coils 424, 426 and sensor coil 430 are strongly coupled inductively and exhibit high mutual inductances.

Figure 7:
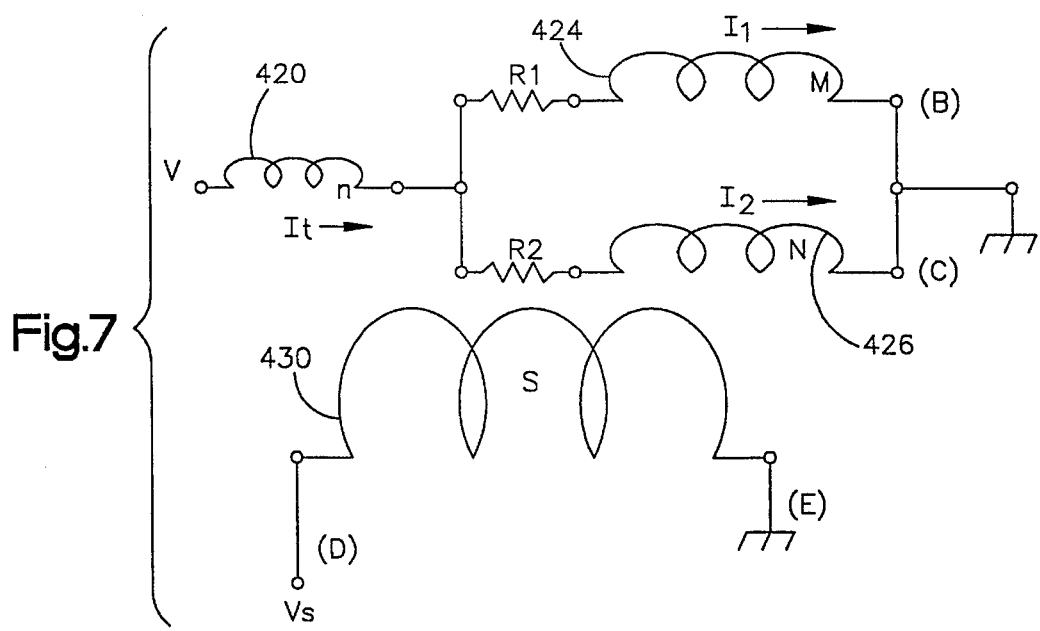
FIG. 7 is an equivalent circuit diagram for the sensor apparatus of FIG. 6.

An equivalent circuit diagram of the sensing apparatus 400 is shown in FIG. 7. Inductor symbols are used to represent the four transformer coils and are appropriately labeled. Three current paths are of interest, AB [through spiral primary coil 420 and fixed coil 424], AC [through spiral primary coil 420 and fixed coil 426] and DE [through sensor coil 430]. Upon application of a sinusoidal voltage "V" at an angular velocity "w", a current $I_1$ can be expected to flow in path AB. Similarly, a second current $I_2$ can be expected in path AC. The two currents together will sum to form current $I_t$. Assuming windings of "N" turns on fixed coil 426, "M" turns on fixed coil 424, "n" turns on spiral primary coil 420, "S" turns on sensor coil 430 and a reluctance of "R" for transformer core 406, the equations describing the approximate electrical behavior of the system are as follows:

$$I_1 + I_2 = I_t$$

$$\frac{-JV}{w} = \frac{I_1 + I_1 M^2 - I_t Mn - I_1 Mn + I_1 n^2 - I_2 MN + I_2 nN}{R} - \frac{JI_1 r_1}{w}$$

$$\frac{-JV}{w} = \frac{I_2 + I_t Mn - I_1 Mn + I_2 Mn + I_t n^2 - I_1 MN + I_2 nN^2}{R} - \frac{JI_2 r_2}{w}$$

$$\frac{-JV_s}{w} = \frac{-(I_1 MS) + I_t nS + I_2 NS}{R}$$

In the preceding equations, inductor theory has been applied to determine the inductance of a "K" turn coil as "$K^2/R$" where "R" is the reluctance. The mutual inductance between "N" and "M" turn coils on the same transformer frame is determined as "NM/R". Also, "$r_1$" and "$r_2$" are given as cumulative series resistance in paths AB and AC respectively. Series resistance is treated as negligible and is ignored for the DE path as the use of a high impedance detector drawing negligible current is assumed. Note also that "J" is equal to the square root of −1. Solving for "$V_s$", the voltage across the sensor coil 430, the following is obtained:

$$V_s = [SVw \, (JnRr_1 + JNRr_1 - JMRr_2 + JnRr_2 + Mw -$$
$$2nw + 2M^2 nw - Mn^2 w - Nw - MnNw + n^2 Nw - nN^2 w)] /$$
$$(R^2 r_1 r_2 + JRr_1 w + 2JMnRr_1 w + Jn^2 Rr_1 w + JN^2 Rr_1 w +$$
$$JRr_2 w + JM^2 Rr_2 w - 2JMnRr_2 w + Jn^2 Rr_2 w - w^2 - M^2 w^2 -$$
$$2M^3 nw^2 - 2n^2 w^2 + 3M^2 n^2 w^2 - Mn^3 w^2 + M^2 nNw^2 -$$
$$2Mn^2 Nw^2 + n^2 Nw^2 - N^2 w^2 + MnN^2 w^2 - n^2 N^2 w^2]$$

Figure 8:
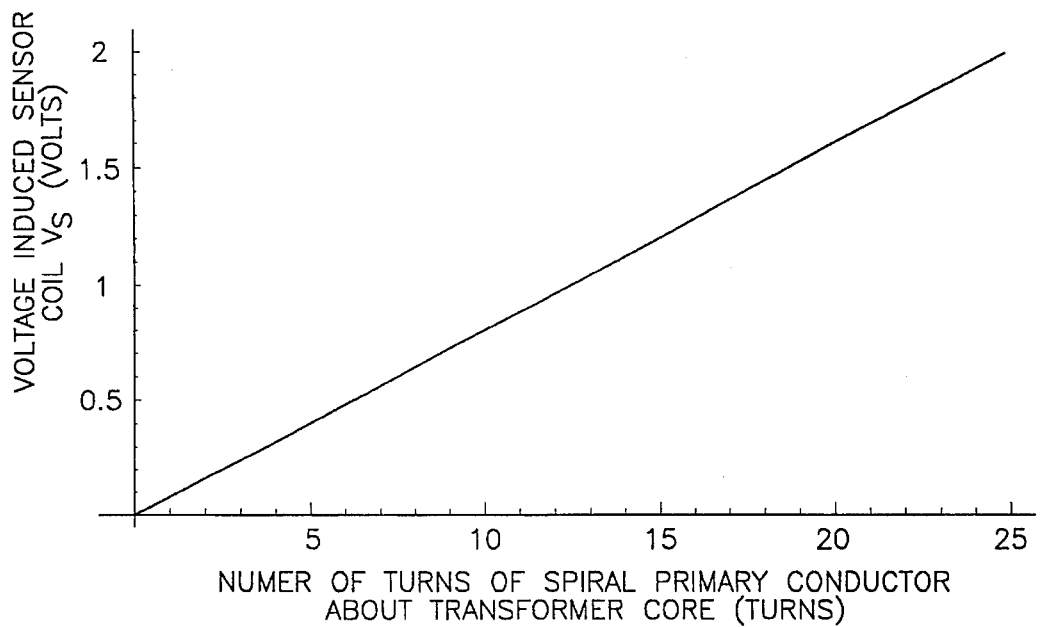
FIG. 8 is a graph showing the relationship between a number of turns of a spiral primary conductor about a transformer coil versus a voltage induced in a sensor coil for the sensor apparatus of FIG. 6.
Figure 9:
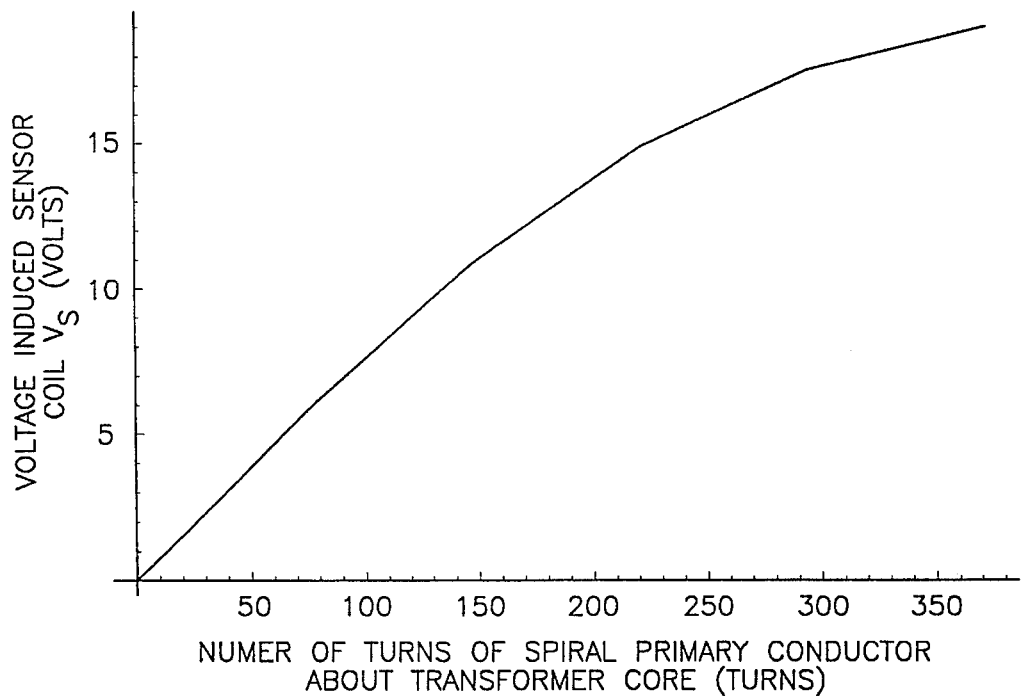
FIG. 9 is a graph showing the relationship between a number of turns of a spiral primary conductor about a transformer coil versus a voltage induced in a sensor coil for the sensor apparatus of FIG. 6 over an expanded range of number of turns.

The parameter of interest in the expression for "$V_s$", the voltage across the sensor coil 430, is the variation in "$V_s$" as a function of n, the number of turns on the spiral primary coil 420. For cases where "M" and "N" are much larger than n, an approximately linear variation between "$V_s$" and n is found. For example, by setting "M" and "N" to 500, w to 20000π, S to 2000 and $r_1$ and $r_2$ to 10, and the reluctance R to $2.03 \times 10^7$ At/Wb, results in the relationship between $|V_s|$ and "n" seen in FIG. 8. As can been seen, the results are highly linear. From the expression for $V_s$ above, it can be seen that the degree of linearity improves as the ratio of "(n+M−N)/M" approaches zero and worsens when the ratio grows. FIG. 9 shows the case when "n" approaches the 500 turn value of "N" and "M". As can be seen, the linearity falls off as "n" approaches "M" and "N". When "M" and "N" are not equal, an offset is present in the "$V_s$" versus turns variation. The utility of this embodiment arises from its linearity with a constant AC voltage drive. Without the presence of the two opposite turn sense fixed coils 424, 426, a constant AC current drive is required as provided by a current limiting resistor in the sensor apparatuses described in connection with FIGS. 1–3. A modification to the present embodiment would include connecting a spiral coil in electrical series with each of the fixed coils 424, 426. The two sets of series connected spiral and fixed coils are then driven in parallel. This modification changes the preceding calculations to an extent, but still results in an approximately linear relationship between "$V_s$" and "n" where "n" is the number of turns made of the spiral primary coil about the transformer core and "$V_s$" is the induced voltage across the sensor coil 430.

The present invention has been described with a degree of particularity. It is the intent, however, that the invention include modification from the disclosed design falling within the spirit or scope of the appended claims.

We claim:

1. Apparatus for sensing a rotational position of a shaft comprising:

a) energizing means for supplying a time varying voltage;

b) a sensor coil wound around a portion of a magnetically permeable transformer core means;

c) a flexible single loop primary coil overlying another portion of the transformer core means, the single loop coil being secured to the transformer core means at a first position on the single loop coil and secured to a mechanical pickup at a second position on the coil, the single loop coil being energized by the time varying voltage for magnetically inducing an output signal in the sensor coil;

d) a transmission means for coupling the mechanical pickup to the shaft such that a rotational displacement of the shaft displaces the mechanical pickup with respect to the transformer core means thereby causing a variance in the output signal in the sensor coil proportional to the displacement of the shaft; and e) a detector means connected to the sensor coil for monitoring the output signal and correlating the output signal with the rotational displacement of the shaft.

2. The sensing apparatus of claim 1 wherein the energizing means further includes a second magnetically permeable transformer core means having an energized primary coil wound around a portion of the second core means and a secondary coil wound around another portion of the second transformer core, a first end of the secondary coil being electrically coupled to the single loop coil at the first position and a second end of the secondary coil being electrically coupled to the single loop coil at the second position, the primary coil magnetically inducing the time varying voltage in the secondary coil and thereby energizing the single loop coil coupled to the secondary coil with the time varying voltage.

3. The sensing apparatus of claim 2 wherein the number of turns of the primary coil is greater than the number of turns of the secondary coil.

4. The sensing apparatus of claim 1 wherein the first and second positions on the single loop primary coil are substantially 180 degrees apart.

5. The sensing apparatus of claim 1 wherein the transmission means includes a capstan rotatably overlying a portion of the transformer core means.

6. The sensing apparatus of claim 1 wherein said detector means provides a measure of a frequency of said output signal.

7. The sensing apparatus of claim 1 wherein said detector means provides a measure of a phase of said output signal.

8. The sensing apparatus of claim 1 wherein said detector means provides a measure of an amplitude of said output signal.

9. Apparatus for sensing a rotational position of a shaft comprising:

a) first and second magnetically permeable transformer core means;

b) a primary coil wound around a portion the first transformer core means;

c) a secondary coil wound around another portion of the first transformer core means;

d) energizing means for applying a time varying voltage to the primary coil to magnetically induce a signal in the secondary coil;

e) a sensor coil wound around a portion of the second transformer core means;

f) a transmission means coupled to the shaft for rotation with the shaft and overlying a segment of the second transformer core means;

g) first and second clock spring spiral coils each having a first and a second end and including a plurality of number of turns overlying the second transformer core means, the first end of each spiral coil secured to the transmission means and the second end of each spiral coil being fixed with respect to the second transformer core means, the spiral coils being wound in opposite turn senses such that a rotational displacement of the shaft increases the number of turns of one of the spiral coils and correspondingly decreases the number of turns of the other of the spiral coils;

h) electrical conduction means for connecting one end of the secondary coil to one of the first and second ends of each of the spiral coils and an opposite end of the secondary coil to the other of the first and second ends of each of the spiral coils thereby energizing the spiral coils and magnetically inducing an output signal in the sensor coil, the output signal varying with a change in the number of turns of the spiral coils; and i) a detector means connected to the sensor coil for monitoring the output signal and correlating the output signal with the rotational displacement of the shaft.

10. The sensing apparatus of claim 9 wherein the electrical conduction means includes a strain relief spiral coil having first and second ends and being disposed outside the first and second transformer core means, the strain relief spiral coil secured at its first end to the transmission means and secured with respect to the second transformer core means at its second end.

11. The sensing apparatus of claim 9 wherein the first and second spiral coil have a substantially equal number of turns when the shaft is in a neutral position.

12. The sensing apparatus of claim 9 wherein the sensor coil has a number of turns about the second transformer core means that exceeds a maximum number of turns of either of the two spiral coils.

13. The sensing apparatus of claim 9 wherein said detector means provides a measure of a frequency of said output signal.

14. The sensing apparatus of claim 9 wherein said detector means provides a measure of a phase of said output signal.

15. The sensing apparatus of claim 9 wherein said detector means provides a measure of an amplitude of said output signal.

16. Apparatus for sensing a rotational position of a shaft comprising:

a) a magnetically permeable transformer core means;

b) a sensor coil wound around a portion the transformer core means;

c) a pair of fixed primary coils wound in opposite turn senses around respective portions of the first transformer core means;

d) a transmission means coupled to the shaft for rotation with the shaft and overlying a segment of the transformer core means;

e) a clock spring spiral coil having a first and a second end and including a plurality of number of turns overlying a portion of the transformer core means, the spiral coil first end secured to the transmission means and the second end being fixed with respect to the transformer core means such that a rotational displacement of the shaft changes the number of turns overlying the transformer core means;

f) energizing means for applying a time varying voltage to one of the first and second spiral coil ends;

g) electrical conduction means for connecting the other of the first and second spiral coil ends to an end of each of the fixed primary coils to energize the coils and, together with the spiral coil, magnetically induce an output signal in the sensor coil, the output signal varying with a change in the number of turns of the spiral coil; and h) a detector means connected to the sensor coil for monitoring the output signal and correlating the output signal with the rotational displacement of the shaft.

17. The sensing apparatus of claim 16 wherein the energizing means includes a strain relief clock spring spiral coil having an outer and inner end and being disposed outside the transformer core means, the strain relief spiral coil secured at its first end to the transmission means and secured with respect to the second transformer core means at its second end.

18. The sensing apparatus of claim 16 wherein the fixed primary coils have substantially an equal number of turns about the transformer core means.

19. The sensing apparatus of claim 16 wherein the sensor coil has a number of turns about the transformer core means that exceeds a maximum number of turns of the spiral coil.

20. The sensing apparatus of claim 16 wherein said detector means provides a measure of a frequency of said output signal.

21. The sensing apparatus of claim 16 wherein said detector means provides a measure of a phase of said output signal.

22. The sensing apparatus of claim 16 wherein said detector means provides a measure of an amplitude of said output signal.

23. An inductive sensing apparatus for sensing a rotational position of a shaft comprising:
- a) a sensor coil wound about a first segment of the transformer core means;
- b) transmission means coupled to the shaft for rotation with the shaft;
- c) a spiral conductor including a first and a second end and having a configuration including a plurality of turns, the first end of the conductor electrically coupled to the transmission means, the second end of the conductor held in a stationary position so that as the shaft rotates back and forth about an axis of rotation the spiral conductor is wound more or less tightly thereby changing the configuration of the spiral conductor;
- d) electrical conduction means connected to one of the first and second ends of the spiral conductor for maintaining the end of said spiral conductor at a fixed electrical potential;
- e) means for applying an alternating current voltage to said spiral conductor thereby magnetically inducing a voltage in the sensor coil, the voltage induced in the sensor coil being dependent upon the configuration of the spiral conductor; and
- f) output means connected to said sensor coil for monitoring induced voltage in the sensor coil and correlating said induced voltage with the rotational position of the shaft.

24. Sensing apparatus for sensing an orientation of a shaft comprising:
- a) sensing means including a sensor coil for monitoring shaft orientation based upon a voltage induced in the sensor coil;
- b) transmission means coupled to the shaft for rotation with the shaft;
- e) a spiral conductor including a first and a second end and having a configuration including plurality of turns, said first end of the spiral conductor electrically connected to the transmission means and the second end of the conductor held stationary such that as the shaft rotates back and forth about an axis of rotation the spiral conductor is wound more or less tightly thereby changing the configuration of the spiral conductor;
- d) a primary coil coupled to the transmission means and wound in a direction such that electrically energizing the primary coil and the spiral conductor results in magnetic fields emanating from the primary coil and the spiral conductor to induce a voltage in the sensor coil, the voltage induced being dependent on the configuration of the spiral conductor;
- e) electrical conduction means connected to one of the first and second ends of the spiral conductor for maintaining the end of said spiral coil at a fixed electric potential;
- f) means for applying an alternating current voltage to said spiral conductor; and
- g) output means connected to said sensor coil for monitoring the voltage induced in the sensor coil and correlating said induced voltage with the orientation of the shaft.

* * * * *